United States Patent Office 3,355,453
Patented Nov. 28, 1967

3,355,453
N-SUBSTITUTED BENZO-1,3-OXAZINE-DIONE-(2,4)
Klaus Hasspacher, Biberach an der Riss, Germany, assignor, by mesne assignments, to Boehringer Ingelheim G.m.b.H., Ingelheim am Rhein, Germany, a corporation of Germany
No Drawing. Filed May 24, 1963, Ser. No. 282,887
Claims priority, application Germany, May 25, 1960, T 18,445
12 Claims. (Cl. 260—244)

This is a continuation-in-part of copending application Ser. No. 111,926, filed May 23, 1961.

This invention relates to N-substituted benzo-1,3-oxazine-diones-(2,4) and to various methods of preparing these compounds.

More particularly, the present invention relates to N-substituted benzo-1,3-oxazine-diones-(2,4) of the formula

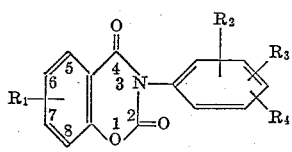

(I)

wherein:

$R_1$ and $R_2$, which may be identical to or different from each other, are selected from the group consisting of chlorine and bromine, $R_3$ is selected from the group consisting of hydrogen, chlorine and bromine, and $R_4$ is selected from the group consisting of hydrogen, chlorine, bromine and nitro.

The compounds of the present invention may be prepared by a variety of methods, but the following have proved to be most convenient and efficient:

*Method A.*—By reacting one mol of an aromatic o-hydroxy-carboxylic acid of the formula

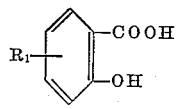

(II)

wherein $R_1$ has the same meanings as defined above in connection with Formula I, with at least two mols of a chloroformic acid ester of the formula

$$Cl-COOR_5 \quad (III)$$

wherein $R_5$ is selected from the group consisting of lower alkyl, aralkyl and aryl, to form a mixed anhydride of the formula

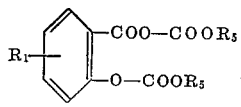

(Va)

wherein $R_1$ and $R_5$ have the meanings previously defined, and then reacting the mixed anhydride Va with an amine of the formula

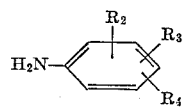

(VI)

wherein $R_2$, $R_3$ and $R_4$ have the meanings previously defined in connection with Formula I.

The reaction of the aromatic o-hydroxy-carboxylic acid of the Formula II with the chloroformic acid ester of the Formula III is carried out at room temperature or while cooling in the presence of an acid-binding agent, that is, an agent capable of tying up or neutralizing the hydrogen chloride split off by the reaction, the amount of acid-binding agent present in the reaction mixture being at least one molar equivalent of the amount of chloroformic acid ester used as the starting material. Examples of suitable acid-binding agents are inorganic bases, such as alkali metal hydroxides, alkali metal carbonates and the like, or tertiary organic bases, such as triethylamine, tributylamine, pyridine, N-methyl-piperidine and the like. The reaction is further advantageously performed in the presence of an inert organic solvent, such as benzene, toluene, tetrahydrofuran, dioxane and the like. These inert organic solvents may also be present in the form of mixtures with water, which is especially useful when an inorganic base is used as the acid-binding agent.

The mixed anhydride Va obtained in the manner described above does not need to be isolated, but may instead be directly reacted with an amine of the Formula VI in the presence of one of the above mentioned solvents. This reaction is advantageously performed at room temperature and is carried to completion at moderately elevated temperatures.

*Method B.*—By reacting an o-hydroxy-carboxylic acid carbonate compound of the formula

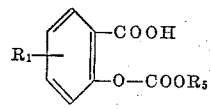

(IV)

wherein $R_1$ has the same meanings as defined above in connection with Formula I and $R_5$ has the same meanings as defined above in connection with Formula III, either with an equimolar amount of a chloroformic acid ester of the Formula III above or with a halogenating agent, such as a thionyl halide, a sulfuryl halide or a phosphorus halide, to form a mixed anhydride of the formula

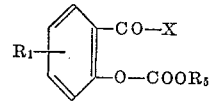

(Vb)

wherein X is either halogen or $-OCOOR_5$, $R_1$ and $R_5$ having the meanings previously defined, and then reacting the mixed anhydride Vb with an amine of the formula

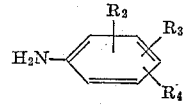

(VI)

wherein $R_2$, $R_3$ and $R_4$ have the meanings previously defined in connection with Formula I.

The reaction of carbonate compound IV with the chloroformic acid ester III is carried out in the same manner and under the same conditions as described in Method A.

However, the reaction of carbonate compound IV with the halogenating agent is performed at elevated temperatures, preferably at the boiling point of the halogenating agent, and advantageously with a stoichiometric excess of the halogenating agent. If desired, this reaction may also be performed in the presence of an inert solvent. The unreacted excess of halogenating agent is distilled off in vacuo after completion of the reaction.

The mixed anhydride Vb obtained in the manner described above does not need to be isolated, but may instead be directly reacted with an amine of the Formula VI in the presence of one of the above mentioned solvents. This reaction is advantageously performed at room temperature and is carried to completion at moderately elevated temperatures. In the event that X in Formula Vb is a halogen, the reaction must be performed in the presence of an acid-binding agent, such as triethylamine or pyridine, and preferably in the presence of an inert organic solvent, such as benzene. Thereafter, water is added to the reaction mixture, the organic phase is decanted and the organic solvent is distilled off from the separated organic phase. The distillation residue is then advantageously heated for ten to thirty minutes at a temperature above 100° C. in order to complete the ring closure. Thereafter, the final product is recrystallized in the usual manner.

Method C.—By reaction of an o-hydroxy-benzanilide of the formula

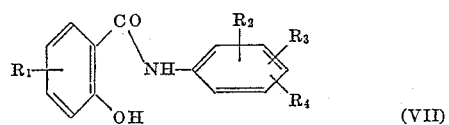

wherein $R_1$, $R_2$, $R_3$ and $R_4$ have the meanings previously defined in connection with Formula I, with either phosgene or with a chloroformic acid ester of the Formula III above or with a carbonic acid ester of the formula $$CO(OR_5)_2 \quad (VIII)$$

wherein $R_5$ has the meanings previously defined in connection with Formula III.

The reaction is advantageously performed in the presence of an acid-binding agent and preferably in the presence of an inert organic solvent, such as benzene, toluene, tetrahydrofuran and the like. The reaction is further advantageously performed at elevated temperatures, preferably at the boiling point of the inert organic solvent if one is used. Suitable acid-binding agents for this reaction are tertiary organic bases, such as triethylamine, tributylamine, pyridine or N-methyl-piperidine; an excess of the particular tertiary organic base may also be employed as the solvent medium. In the reaction with the carbonic acid ester of the formula VIII the tertiary organic base serves as a catalyst.

Method D.—By reacting an aromatic o-hydroxy-carboxylic acid of the Formula II above with a phenyl isocyanate of the formula

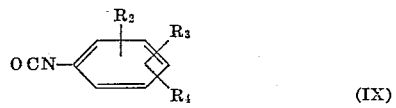

or a carbamic acid chloride of the formula

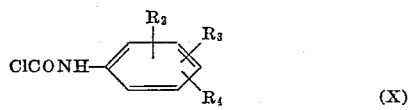

to form an aromatic o-O-phenyl-carbamoyl-carboxylic acid of the formula

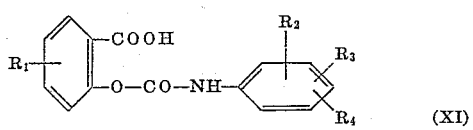

and subjecting this o-O-phenyl-carbamoyl-carboxylic acid to a ring closure reaction to form a compound of the Formula I. In Formulas IX, X and XI the substituents $R_1$, $R_2$, $R_3$ and $R_4$ all have the previously defined meanings.

The reaction of the o-hydroxy carboxylic acid II with the phenyl isocyanate IX is performed at elevated temperatures, preferably at temperatures between 50 and 100° C. Equimolar amounts of the starting materials are preferably employed. The reaction is advantageously performed in the presence of an inert organic solvent, such as benzene, toluene, chloroform, ethylene chloride, dioxane and the like.

The reaction of the o-hydroxy-carboxylic acid II with a phenyl carbamic acid chloride X is performed in the presence of an agent capable of tying up or neutralizing the hydrogen chloride split off by the reaction, preferably in the presence of an inert organic solvent and advantageously at room temperature or while cooling the reaction mixture. Suitable agents to tie up the hydrogen chloride formed by the reaction are tertiary amines, such as triethylamine or pyridine, or also inorganic bases such as alkali metal hydroxides, alkali metal carbonates and the like; in the event that tertiary organic bases are used, they may also serve as the solvent medium for the reaction mixture.

The ring closure reaction to which the aromatic o-O-phenyl-carbamoyl-carboxylic acid XI is subjected to form a compound of the Formula I is effected either by heating compound XI to temperatures between 100 and 200° C., advantageously in a high boiling point solvent such as Tetralin or Decalin, or by heating compound XI with agents which split off water, such as thionyl chloride or phosphorus halides, preferably at temperatures between 80 and 100° C. This last mentioned reaction is, if desired, performed in the presence of an inert solvent and in the presence of a stoichiometric excess of the agent which promotes the splitting off of water.

The separation of the reaction product from the reaction mixtures of the four above described reactions is effected in the usual manner. After distilling off the high boiling point solvent or the excess of the agent which promotes the splitting off of water in vacuo, the residual substance is purified by recrystallization.

The aromatic o-hydroxy-carboxylic acids of the Formulas II and IV as well as the amines of the Formula VI used as starting materials in these methods are well known substances; the phenyl isocyanates of the Formula IX and the phenyl carbamic acid chlorides of the Formula X may, if they are not already known substances, be prepared in known fashion from the amines of the Formula VI.

The following examples illustrate the preparation of a representative number of compounds embraced by Formula I above. It should be understood, however, that the present invention is not limited to the particular examples given below.

EXAMPLE I

*Preparation of 3-(3',5'-dichlorophenyl)-6-chloro-benzo-1,3-oxazine-dione-(2,4) by Method A*

86 gm. of 5-chloro-salicylic acid and 140 cc. of triethylamine were dissolved at 0° C. in 500 cc. tetrahydrofuran. 96 cc. of chloroformic acid ethyl ester were added to the resulting solution and, after allowing the mixture to stand for ten minutes, it was combined with a solution of 81 gm. of 3,5-dichloroaniline in 200 cc. of tetrahydrofuran, accompanied by stirring. The reaction mixture thus obtained was stirred for one hour at room temperature and for two hours at 60° C. and was thereafter admixed with about 1 liter of water. The mixture divided into an aqueous and a tetrahydrofuran phase. The tetrahydrofuran phase was separated and concentrated by evaporation. The oily residue obtained thereby was heated for fifteen minutes at 120° C., was allowed to cool and was finally recrystallized from a mixture of dioxane and methanol. 55 gm. of the compound of the formula

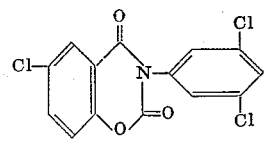

were obtained which had a melting point of 230.5° C.

EXAMPLE II

*Preparation of 3-(3',4'-dichlorophenyl)-6-chloro-benzo-1,3-oxazine-dione-(2,4) by Method A*

86 gm. of 5-chloro-salicylic acid and 140 cc. of triethylamine were dissolved at +5° C. in 500 cc. of tetrahydrofuran, the resulting solution was admixed with 96 cc. of chloroformic acid ethyl ester and, after allowing the mixture to stand for ten minutes, it was combined with a solution of 81 gm. of 3,4-dichloroaniline in 200 cc. of tetrahydrofuran, while stirring. The reaction mixture thus obtained was stirred for one hour at room temperature and for two hours at 60° C. and was thereafter admixed with 1 liter of water. The mixture divided into an aqueous phase and a tetrahydrofuran phase. The latter was separated and was concentrated by evaporation. The oil residue obtained thereby was heated for fifteen minutes at 150° C. and, after allowing it to cool, was recrystallized from a mixture of dioxane and methanol. 43 gm. of the compound of the formula

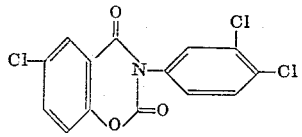

were obtained which had a melting point of 240° C.

EXAMPLE III

*Preparation of 3-(2',4',5'-trichlorophenyl)-6-chloro-benzo-1,3-oxazine-dione-(2,4) by Method A*

86 gm. of 5-chloro-salicylic acid and 140 cc. of triethylamine were dissolved at —5° C. in 500 cc. of tetrahydrofuran, the resulting solution was admixed with 85 cc. of chloroformic acid methyl ester and, after allowing the mixture to stand for fifteen minutes, it was combined with a solution of 98 gm. of 2,4,5-trichloroaniline in 200 cc. of tetrahydrofuran, accompanied by stirring. The reaction mixture thus obtained was stirred for two hours at room temperature and for two hours at 60° C. and was then admixed with 1 liter of water. The mixture divided into an aqueous phase and a tetrahydrofuran phase. The latter was separated and concentrated by evaporation. The oily residue thus obtained was heated for thirty minutes at 170° C. and, after allowing it to cool, was recrystallized from a mixture of dimethylformamide and methanol. 28 gm. of the compound of the formula

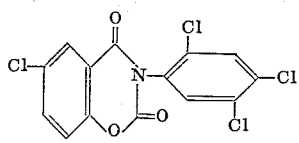

were obtained which had a melting point of 190° C.

Using a method analogous to that described above, the following compounds were also prepared:

(a).—*3 - (2' - chloro - 4' - nitrophenyl) - 6 - chloro-benzo - 1,3 - oxazine - dione - (2,4)*, M.P. 226° C., of the formula

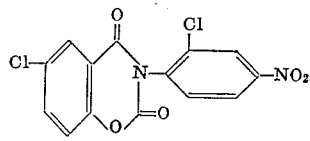

from 5 - chloro - salicylic acid, 2 - chloro - 4-nitroaniline and chloroformic acid methyl ester.

(b).—*3 - (2' - chloro - 4'nitrophenyl) - 6 - bromo-benzo - 1,3 - oxazine - dione - (2,4)*, M.P. 253° C., of the formula

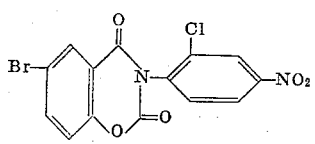

from 5 - bromo - salicylic acid, 2 - chloro - 4 - nitroaniline and chloroformic acid methyl ester.

(c.)—*3 - (4' - chlorophenyl) - 6 - bromo - benzo - 1,3-oxazine - dione (2,4)*, M.P. 213° C., of the formula

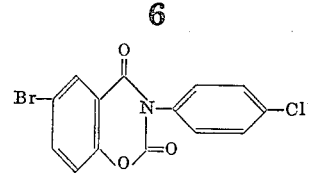

from 5 - bromo - salicylic acid, 4 - chloroaniline and chloroformic acid methyl ester.

(d).—*3 - (4' - cholophenyl) - 6 - chloro-benzo - 1,3-oxazine - dione - (2,4)*, M.P. 215° C., of the formula

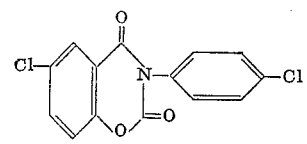

from 5 - chloro - salicylic acid, 4 - chloroaniline and chloroformic acid methyl ester.

(e).—*3 - (4' - bromophenyl) - 6 - chloro - benzo-1,3 - oxazine - dione - (2,4)*, M.P. 203° C., of the formula

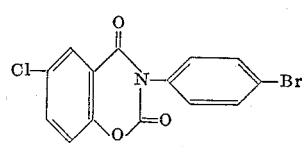

from 5 - chloro - salicylic acid, 4 - bromoaniline and chloroformic acid methyl ester.

EXAMPLE IV

*Preparation of 3-(3'-4'-dichlorophenyl)-6-chloro-benzo-1,3-oxazine-dione-(2,4) by Method B*

115 gm. of 5 - chloro - carbomethoxy - salicylic acid and 70 cc. or triethylamine were dissolved at 0° C. in 500 cc. of tetrahydrofuran. The resulting solution was admixed with 48 cc. of chloroformic acid ethyl ester, and the mixture was allowed to stand for about ten minutes. Thereafter, the mixture was combined with a solution of 81 gm. of 3,4 - dichloroaniline in 200 cc. of tetrahydrofuran, accompanied by stirring. The resulting reaction mixture was then stirred for two hours at room temperature and for two hours at 60° C. Subsequently, the solvent was distilled off in vacuo, the residue was washed with water and finally heated for fifteen minutes at 150° C. After allowing it to cool, the product was recrystallized from a mixture of dioxane and methanol, yielding 78 gm. of the compound of the formula

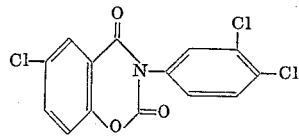

having a melting point of 240° C.

EXAMPLE V

*Preparation of 3-(3',5'-dichlorophenyl)-6-chloro-benzo-1,3-oxazine-dione-(2,4) by Method B*

A mixture of 23 gm. of 5 - chloro - carbomethoxy-salicylic acid and 20 gm. of thionyl chloride was refluxed for one hour. Thereafter, the excess, unreacted thionyl chloride was distilled off in vacuo and the distillation residue was taken up in 150 cc. of benzene. To this benzene solution a solution of 16 gm. of 3,5-dichloroaniline and 12 gm. of triethylamine in 50 cc. of benzene was added dropwise at room temperature, accompanied by stirring. The resulting mixture was heated for two hours at 60° C. and then the solvent was distilled off. The distillation residue was washed with water, heated for twenty minutes at 150° C. and was finally recrystallized from a mixture of dioxane and methanol. 21 gm. of the compound of the formula

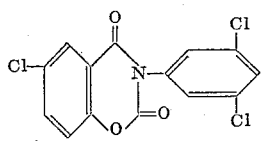

were obtained, which had a melting point of 230° C.

EXAMPLE VI

*Preparation of 3-(4'-chlorophenyl)-6-bromo-benzo-1,3-oxazine-dione-(2,4) by Method C*

20 gm. of 5-bromo-salicylic acid-4-chloroanilide were dissolved in 100 cc. of pyridine, and the resulting solution was admixed dropwise at 10° C. with 7.0 cc. of chloroformic acid ethyl ester. The resulting reaction solution was refluxed for two hours and was thereafter poured into 1 liter of water. The precipitate formed thereby was separated by vacuum filtration, washed and recrystallized from a mixture of dioxane and methanol. 8.5 gm. of the compound of the formula.

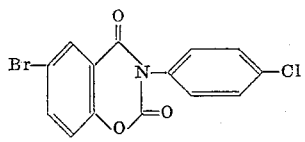

were obtained, which had a melting point of 213° C.

EXAMPLE VII

*Preparation of 3-(4'-chlorophenyl)-6-chloro-benzo-1,3-oxazine-dione-(2,4) by Method D*

34.4 gm. of 5-chloro-salicylic acid and 30.6 gm. of p-chloro-phenylisocyanate were dissolved in 200 cc. of dioxane. The resulting solution was heated for ten hours at 80–90° C. and was thereafter allowed to stand for two days at room temperature. Subsequently, the solvent was distilled off in vacuo, and the residue was refluxed for one hour with 30 gm. of thionyl chloride. After distilling off the excess, unreacted thionyl chloride, the residue was recrystallized from a mixture of dioxane and methanol. 33 gm. of the compound of the formula

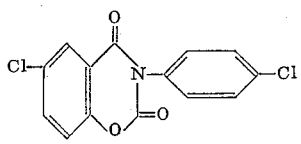

were obtained, which had a melting point of 215° C.

EXAMPLE VIII

*Preparation of 3-(2',5'-dichlorophenyl)-6-chloro-benzo-1,3-oxazine-dione-(2,4) by Method C*

97.5 gm. of 5-chloro-salicylic acid-2',5'-dichloro-anilide and 36.5 gm. of triethylamine were dissolved at 0° C. in 150 cc. of tetrahydrofuran, and the resulting solution was slowly admixed with 39.2 gm. of chloroformic acid ethyl ester. The reaction mixture thus obtained was refluxed for four hours and was then stirred into 2 liters of water. A precipitate formed which was separated and recrystallized from a mixture of dioxane and methanol. 33 gm. of the compound of the formula

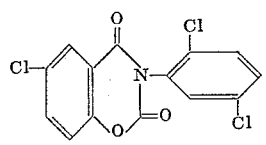

were obtained, which had a melting point of 192° C.

Using an analogous procedure, the following compounds were also prepared:

(a).—*3 - (2',3' - dichlorophenyl) - 6 - chloro-benzo-1,3-oxazine-dione-(2,4)*, M.P. 207° C., of the formula

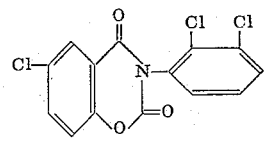

from 5-chloro-salicylic acid-2',3'-dichloroanilide and chloroformic acid ethyl ester.

(b).—*3 - (2',4' - dichlorophenyl) - 6 - chloro - benzo-1,3-oxazine-dione-(2,4)*, M.P. 205° C., of the formula

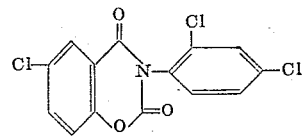

from 5-chloro-salicylic acid-2',4'-dichloroanilide and chloroformic acid ethyl ester.

(c).—*3 - (2',4',6' - trichlorophenyl) - 6 - chloro -benzo-1,3-oxazine-dione-(2,4)*, M.P. 208° C., of the formula

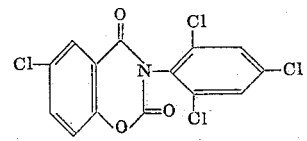

from 5-chloro-salicylic acid-2',4',6'-trichloroanilide and chloroformic acid ethyl ester.

The compounds according to the present invention, that is, those embraced by Formula I above, have useful properties. More particularly, they exhibit excellent antimicrobial and fungicidal activities and are in this respect substantially and surprisingly superior to structurally related known compounds. In addition, the compounds of the present invention exhibit excellent cestocidal activities; by "cestocidal" I means the ability to kill cestoids (tapeworms). Moreover, they have a very low toxicity toward warm-blooded animals, a very good skin compatibility and an excellent stability against oxidation, heavy metals and exposure to light. Particularly remarkable is their effectiveness against staphylococci and streptococci as well as against fungi, such as Epidermophyton.

Still further, the compounds of the present invention exhibit molluscacidal and gastropodacidal activities. In this respect they are especially effective against the small water snails which are hosts of Schistosoma parasites, the trematodes which cause schistosomiasis. Structurally related known compounds are for practical purposes completely devoid of this activity.

By virtue of the above-enumerated properties the compounds according to the present invention are useful as disinfectants, as antibacterial and antifungal agents, as anticestoidal agents, and especially as molluscacidal agents.

For external therapeutic treatment the compounds according to the present invention are advantageously applied as active ingredients in compositions consisting essentially of the active ingredient and an inert, pharmacologically acceptable carrier adapted for external application; for instance, the compounds may be incorporated in an amount of 0.1% to 5.0% by weight into powders, pastes, ointments, soaps or detergents.

For internal therapeutic treatment the compounds are administered as active ingredients in tablets, coated pills, suppositories or similar customary dosage unit compositions, the daily dose rate being from 100 to 5000 mgm.

For molluscacidal and gastropodacidal purposes the compounds of the present invention are merely added to the waters infested with molluscs or gastropods in amounts such that a lethal concentration of the compounds in the infested waters results. The compounds are lethal to molluscs and gastropods in concentrations of up to 1 part per five million parts of water.

The following examples illustrate a few compositions adapted for external or internal therapeutic use, comprising compounds according to the present invention as active ingredients. The parts are parts by weight unless otherwise specified.

EXAMPLE IX

Tablets

The tablets are compounded from the following ingredients:

| | Parts |
|---|---|
| 3 - (2' - chloro - 4' - nitrophenyl) - 6 - bromo-benzo-1,3-oxazine-dione-(2,4) | 200.0 |
| Lactose | 100.0 |
| Soluble starch | 16.7 |
| Glycerin | 4.0 |
| Potato starch | 65.0 |
| Talcum | 12.0 |
| Magnesium stearate | 2.3 |
| Total | 400.0 |

*Compounding procedure.*—The above ingredients are admixed with each other, the mixture is homogeneously blended and is then pressed into tablets weighing 400 mgm. each. Each tablet contains 200 mgm. of the active ingredient.

EXAMPLE X

Coated pills

The tablets prepared in accordance with Example IX are coated in the customary manner with a thin candy shell consisting essentially of talcum and sugar, and the coated tablets are polished with bees' wax.

EXAMPLE XI

Suppositories

The suppositories are compounded from the following ingredients:

| | Parts |
|---|---|
| 3 - (3',4' - dichlorophenyl) - 6-chloro-benzo-1,3-oxazinedione-(2,4) | 300.0 |
| Suppository base (M.P. 32° C.) | 1510.0 |
| Total | 1810.0 |

*Compounding procedure.*—The suppository base is melted, the active ingredient is blended into the molten base, and the resulting composition is poured into cooled suppository molds holding 1810 mgm. of the composition. Each suppository contains 300 mgm. of the active ingredient.

EXAMPLE XII

Disinfectant soap

The soap is compounded from the following ingredients:

| | Parts |
|---|---|
| 3 - (3',4'-dichlorophenyl)-6-chloro-benzo-1,3-oxazine-dione-(2,4) | 1.0 |
| Soap base (alkali metal salt of fatty acid) | 99.0 |
| Total | 100.0 |

*Compounding procedure.*—The active ingredient is blended into the molten soap base, and the resulting composition is molded into soap cakes weighing 100 gm. each in the usual manner. Each cake contains 1% by weight of the active ingredient.

EXAMPLE XIII

Disinfectant detergent

The detergent composition is compounded from the following ingredients:

| | Parts |
|---|---|
| 3 - (3',4' - dichlorophenyl) -6- chloro-benzo-1,3-oxazinedione-(2,4) | 2.0 |
| Detergent powder | 98.0 |
| Total | 100.0 |

*Compounding procedure.*—The active ingredient, in a finely powdered state, is carefully and homogeneously blended into the detergent powder. The resulting detergent composition contains 2% by weight of the active ingredient.

EXAMPLE XIV

Ointment

The ointment is compounded from the following ingredients:

| | Parts |
|---|---|
| 3 - (3',4' - dichlorophenyl) - 6 - chloro-benzo-1,3-oxazinedione-(2,4) | 0.5 |
| Wool grease | 20.0 |
| Paraffin | 10.0 |
| Distilled water | 10.0 |
| Vaseline, q.s. ad | 100.0 |

*Compounding procedure.*—The finely milled active ingredient is stirred into an equal amount of vaseline. The wool grease, the paraffin and the remaining amount of vaseline are melted together on a water bath, and the resulting mixture is emulsified at 70° C. with the distilled water which has also been preheated to 70° C. The emulsion is stirred until cool, the vaseline-active ingredient mixture is added, and the resulting composition is passed several times through mixing rolls. The finished ointment contains 0.5% by weight of the active ingredient.

EXAMPLE XV

Paste

The paste is compounded from the following ingredients:

| | Parts |
|---|---|
| 3 - (3',4' - dichlorophenyl) - 6-chloro-benzo-1,3-oxazinedione-(2,4) | 1.0 |
| Zinc oxide | 20.0 |
| Talcum | 20.0 |
| Vaseline, q.s. ad | 100.0 |

*Compounding procedure.*—The active ingredient, the zinc oxide and talcum are screened and homogeneously stirred into the molten vaseline. The resulting paste, containing 1.0% by weight of the active ingredient, is passed through mixing rolls.

EXAMPLE XVI

Dusting powder

The powder is composed from the following ingredients:

| | Parts |
|---|---|
| 3 - (3',4' - dichlorophenyl) - 6 - chloro - benzo-1,3-oxazine-dione-(2,4) | 0.5 |
| Powder base | 99.5 |
| Total | 100.0 |

*Compounding procedure.*—The two ingredients are admixed with each other and the mixture is milled in a suitable mixing mill. The finished dusting powder contains 0.5% by weight of the active ingredient.

Obviously, the particular active ingredients in Examples IX through XVI are given for illustration only and may be replaced by any of the other compounds embraced by Formula I above.

While I have illustrated my invention with the aid of certain specific embodiments thereof, it will be readily apparent to others skilled in the art that the invention is not limited to these embodiments and that various changes and modifications may be made without departing from the spirit of the invention or the scope of the appended claims.

What I claim is:

1. An N-substituted benzo-1,3-oxazine-dione-(2,4) of the formula

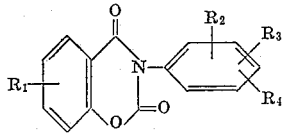

wherein:
$R_1$ and $R_2$ are selected from the group consisting of chlorine and bromine,
$R_3$ is selected from the group consisting of hydrogen, chlorine and bromine, and
$R_4$ is selected from the group consisting of hydrogen, chlorine, bromine and nitro.

2. An N-substituted benzo-1,3-oxazine-dione-(2,4) of the formula

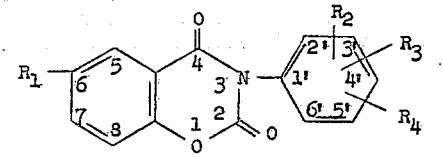

wherein.
$R_1$ is selected from the group consisting of chlorine and bromine,
$R_2$ is selected from the group consisting of 2'-chloro, 3'-chloro, 4'-chloro and 4'-nitro,
$R_3$ is selected from the group consisting of hydrogen, 3'-chloro, 4'-chloro and 5'-chloro, and
$R_4$ is selected from the group consisting of 5'-chloro, 6'-chloro and 4'-nitro.

3. 3 - (3',4' - dichlorophenyl) - 6 - chloro-benzo - 1,3-oxazine-dione-(2,4).
4. 3 - (3',5' - dichlorophenyl) - 6 - chloro-benzo - 1,3-oxazine-dione-(2,4).
5. 3 - (2',3' - dichlorophenyl) - 6 - chloro-benzo - 1,3-oxazine-dione-(2,4).
6. 3 - (2',4' - dichlorophenyl) - 6 - chloro-benzo - 1,3-oxazine-dione-(2,4).
7. 3 - (2',5' - dichlorophenyl) - 6 - chloro-benzo - 1,3-oxazine-dione-(2,4).
8. 3 - (2',5'-dichlorophenyl) - 6 - bromo-benzo - 1,3-oxazine-dione-(2,4).
9. 3 - (2' - chloro - 4' - nitrophenyl) - 6 - chloro-benzo-1,3-oxazine-dione-(2,4).
10. 3 - (2' - chloro - 4' - nitrophenyl)-6-bromo-benzo-1,3-oxazine-dione-(2,4).
11. 3 - (2',4',5' - trichlorophenyl) - 6 - chloro-benzo-1,3-oxazine-dione-(2,4).
12. 3 - (4' - bromophenyl) - 6 - chloro-benzo - 1,3-oxazine-dione-(2,4).

References Cited
UNITED STATES PATENTS

| | | | |
|---|---|---|---|
| 2,835,668 | 5/1958 | Shapiro et al. | 260—244 |
| 3,100,174 | 8/1963 | Stevens | 167—33 |
| 3,100,175 | 8/1963 | Bourquin et al. | 167—33 |
| 3,122,538 | 2/1964 | Clauson-Kass et al. | 260—244 |

WALTER A. MODANCE, *Primary Examiner.*

NICHOLAS S. RIZZO, *Examiner.*

R. T. BOND, *Assistant Examiner.*